(12) United States Patent
De-Gyves-De-la-Peña et al.

(10) Patent No.: US 6,183,535 B1
(45) Date of Patent: Feb. 6, 2001

(54) METHOD FOR INCREASING THE CAPACITY OF A DIRECT REDUCED IRON PLANT WITHOUT INCREASING ITS REFORMER CAPACITY

(75) Inventors: Alejandro De-Gyves-De-la-Peña, Puerto Ordaz (VE); Ricardo Viramontes-Brown, Nuevo León (MX)

(73) Assignee: Hylsa, S.A. de C.V., San Nicolas de los Garza, N.L. (MX)

( * ) Notice: Under 35 U.S.C. 154(b), the term of this patent shall be extended for 0 days.

(21) Appl. No.: 09/173,844

(22) Filed: Oct. 16, 1998

(51) Int. Cl.[7] .................................................. C21B 13/02
(52) U.S. Cl. ........................... 75/495; 75/496; 266/156
(58) Field of Search ....................... 75/496, 495; 266/156

(56) References Cited

U.S. PATENT DOCUMENTS 3,764,123 * 10/1973 Beggs et al. ............................ 75/496
5,407,460 * 4/1995 Bueno C et al. ....................... 75/495
6,027,545 * 2/2000 Villarreal-Trevino .................. 75/495

* cited by examiner

*Primary Examiner*—Melvyn Andrews
(74) *Attorney, Agent, or Firm*—A. Thomas S. Safford; Frommer Lawrence & Haug LLP

(57) ABSTRACT

A method and apparatus for increasing the productivity of an existing direct reduction iron (DRI) plant without increasing its reformer capacity existing in the plant. This object is achieved by not only recycling some effluent gas of the reduction reactor to the gas reformer (with natural gas or the like added with an oxidant as make up gas), but also recycling an additional portion of the effluent gas with added natural gas and an oxygen containing stream directly to the reducing gas stream exiting the reformer prior to or as part of its introduction to the reduction reactor, thereby providing additional reducing agents and increasing the reducing capacity of the plant. The oxygen containing stream is preferably added to the recycled reducing gas without preheating. Any excess or purged effluent gas is as usual burned as fuel.

10 Claims, 1 Drawing Sheet

METHOD FOR INCREASING THE CAPACITY OF A DIRECT REDUCED IRON PLANT WITHOUT INCREASING ITS REFORMER CAPACITY

FIELD OF THE INVENTION

The present invention describes a method and apparatus for increasing the capacity of a plant for the production of direct reduced iron, without the necessity of increasing the capacity of the existing reformer.

BACKGROUND OF THE INVENTION

As a consequence of the increasing demand for direct reduced iron (DRI), also known as sponge iron, as well as for pre-reduced iron or the like, in steel making procedures, DRI producers have faced the necessity to increase production, preferably by increasing the production rates of their existing facilities. Typical DRI production facilities are disclosed in U.S. Pat. Nos. 3,748,120; 3,765,872; 3,905,806; 4,099,962; 4,150,972; and 4,556,417. The content of these and the other patent documents cited herein are incorporated by reference.

In order to achieve an increase in the production rate of an existing facility, the most important factors to consider are the reduction reactor capacity and the available reducing gas supply.

Focusing on the available reducing gas supply, increasing the reformer capacity is the first option that one might visualize as a solution to the problem. However, it also would be very expensive.

U.S. Pat. No. 5,407,460 to Bueno et al. describes a process specifically directed to increasing plant capacity without modification of an existing reformer. In this process, natural gas (with an oxidant) is passed through a gas reformer, optionally heated, and mixed first with a stream of preheated air and/or $O_2$ and then with an stream of natural gas. This patent teaches the necessity of a gas pre-heater to treat the $O_2$-containing gas stream prior to its combination with the reducing gas. There is no identification of the "oxidant" used in combination with the natural gas fed to the reformer nor is there any specific disclosure of any recycle gas (whether passing through the reformer or otherwise, although reference is made in the example in column 5 to certain prior art, which includes U.S. Pat. No. 4,046,557 and others, but without identifying which embodiment thereof). The hot $O_2$-containing gas addition burns some of the reducing gas (and possibly some of the natural gas), thereby producing an increase in the temperature (which increases the kinetics of the reduction reactions), with the result that the reduction reactor is able to produce at higher rates since the residence time required to give the same metallization of iron is shorter. The air addition is limited by agglomeration considerations at the resulting higher temperatures. The natural gas combined with the reducing gas from the reformer is itself reformed by oxidants in the recycle gas when in the presence of newly formed DRI as a catalyst (thus increasing the amount of reducing gas without an increase in the reformer size).

U.S. Pat. No. 5,437,708 to Meissner et al. describes a process wherein after cooling/dewatering in a scrubber unit a first portion of the effluent gas from the reduction reactor is reheated and combined with steam and natural gas in a reformer, with the resulting upgraded reducing gas being cooled to temperatures appropriate for reduction of iron ore by mixing with a directly recycled second portion of the reactor effluent gas. The resulting reducing gas mixture is fed to the reduction reactor. optionally, the recycle gas to the reduction reactor can be enriched with methane via line 47 up to a maximum of 4.5 to 5.0% in the resulting reducing gas mixture fed as recycle bustle gas to the reactor. Although there are air A, methane 46, and steam S sources all clustered near the feed of the direct recycle stream 42 to the reactor inlet 34, there is no air (or steam) injection to direct recycle stream 42 (only optional methane injection 47). Somewhat similarly, see especially FIG. 3 of the aforementioned U.S. Pat. No. 4,046,557.

U.S. Pat. No. 5,064,467 to Dam et al. describes a process without any reformer wherein the effluent gas from the reduction reactor is recycled after being mixed with hot air (or air enriched with oxygen) and make-up natural gas, with the resulting combination being introduced to the reduction reactor as the reducing gas stream. This could be thought of as being the opposite of the Bueno et al patent (with the latter teaching use of a reformer with no direct recycle of reducing gas around the reformer and the other teaching no reformer and thus all the reducing gas being directly recycled), and with neither suggesting any intermediate split recycle. U.S. Pat. Nos. 4,528,030 and 5,110,350 are similar (having no reformer), but omitting the air/$O_2$ injection.

U.S. Pat. No. 5,387,274 to Dam et al. describes a process similar to the prior reference (U.S. Pat. No. 5,064,467) with the main difference being the adding of natural gas to the discharge zone. See also U.S. Pat. No. 5,078,788 which adapts these latter embodiments to use heavy hydrocarbons in place of natural gas.

The present invention offers significant advantages over the prior art, overcoming the disadvantage of preheating the oxygen containing gas, as well as being able significantly to increase still further the production capacity of an existing reduction plant by providing means for natural gas reforming with directly recycled gas in the reduction reactor, while at the same time utilizing full capacity of the reformer.

A particular objective of the present invention is to increase the reduction capacity of existing DRI production facilities without the necessity of increasing the capacity of their existing gas reformers.

Another object is to provide a method for a better utilization of the effluent gas leaving the reduction reactor in order to use this stream to increase the reducing gas available for producing DRI.

Another object is to provide a process in which is presented an integration of energy with a suitable arrangement of streams in order to increase the reducing capacity of a facility at a low capital cost, and also produce direct reduced iron, sponge iron or the like at low processing costs and high metallization rates.

Other objects and advantages will be pointed out herein or will be obvious to those skilled in the art.

SUMMARY OF THE INVENTION

As discussed above, the prior art discloses conventional DRI reduction reactors with recycled reducing gas composed mainly of hydrogen and carbon monoxide re-generated by a recycle-onstream reformer with one known modifications including a split reducing gas recycle with one branch of the recycle gas going through the onstream reformer and the other bypassing the reformer to recombine thereafter to cool the reformer gas output. The art also discloses a reduction reactor supplied by a reformer supplemented by the subsequent addition of air and natural gas. However, none teach the present invention which broadly combines both (with one branch of the recycle reducing gas passing entirely through the reformer and with the other branch combining with the reformer output plus added oxygen and gaseous hydrocarbon, typically in the form of natural gas, and optionally plus also steam). This gives an improvement in increasing the reducing gas capacity of the plant without any increase in the size of the reformer on the order of 20% to 30% relative to the closest prior art. See the comparative example below at the end of this specification.

As those skilled in the art will understand, when one recycles the effluent gas stream to the given reformer, one is limited to the gas reformer capacity, and upon reaching the upper limit of its capacity, one cannot increase the amount of natural gas or other additives to the reformer and consequently one cannot increase reducing agents available.

Furthermore, if one merely introduces an oxygen containing stream between the existing reformer and the reduction reactor followed by addition of natural gas, the advantage of increased reducing gas volume that can be achieved is limited by the amount of such additions that will keep the temperature rise in the reactor to below agglomerating levels.

However, the applicants' teaching of including a direct recycle of the cooled/scrubbed spent reducing gas as a further addition to the reformer effluent, results in a process that favorably increases the volume of the additions that can be fed and thus increases significantly the net reducing gas available in the plant (still without modifying the existing reformer). Because of this, there has been found to be an increase in the production rate resulting from practicing the applicants' invention of at least about 20% to 30% over the closet prior art, all without increasing the gas reformer capacity.

A preferred embodiment of the present invention concerns a method for adapting an existing facility producing direct reduced iron, in order to increase its process capacity without the requirement of increasing the size or number of the gas reformer units used in such facility. This process comprises a) feeding a direct reduction shaft reactor with an iron-oxide containing ore;

b) contacting said iron-oxide containing ore with a reducing gas to reduce this material to metallic iron;

c) withdrawing the reduced material in form of direct reduced iron (DRI), sponge iron or the like;

d) withdrawing the reducing gas after having been contacted with the iron-oxide containing material as an effluent gas;

e) recycling a portion of the effluent gas through the gas reformer, using natural gas as a make-up gas and forming the main reduction gas stream;

f) recycling another portion of the effluent gas directly to the main reducing gas stream, prior to its introduction to the direct reduction shaft reactor;

g) introducing natural gas directly to the main reducing gas stream prior to its introduction to the direct reduction shaft reactor; and, h) introducing oxygen or air enriched with oxygen directly to the main reducing gas stream, prior to its introduction to the direct reduction shaft reactor.

A further embodiment of the invention includes the optional introduction of a cooling gas circuit preferably near to the discharge zone. This circuit can be accomplished by introducing natural gas to the reactor, contacting the hot direct reduced iron, exchanging heat and withdrawing the effluent natural gas coolant from the reactor, cooling said gas, pressurizing the gas and recycling it to the reactor using additional natural gas as a make-up gas.

BRIEF DESCRIPTION OF THE DRAWING

In this specification and in the accompanying drawings, we have shown and described preferred embodiments of our invention and have suggested various alternatives and modifications thereof; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION OF PREFERRED EMBODIMENTS OF THE INVENTION

Figure 1:
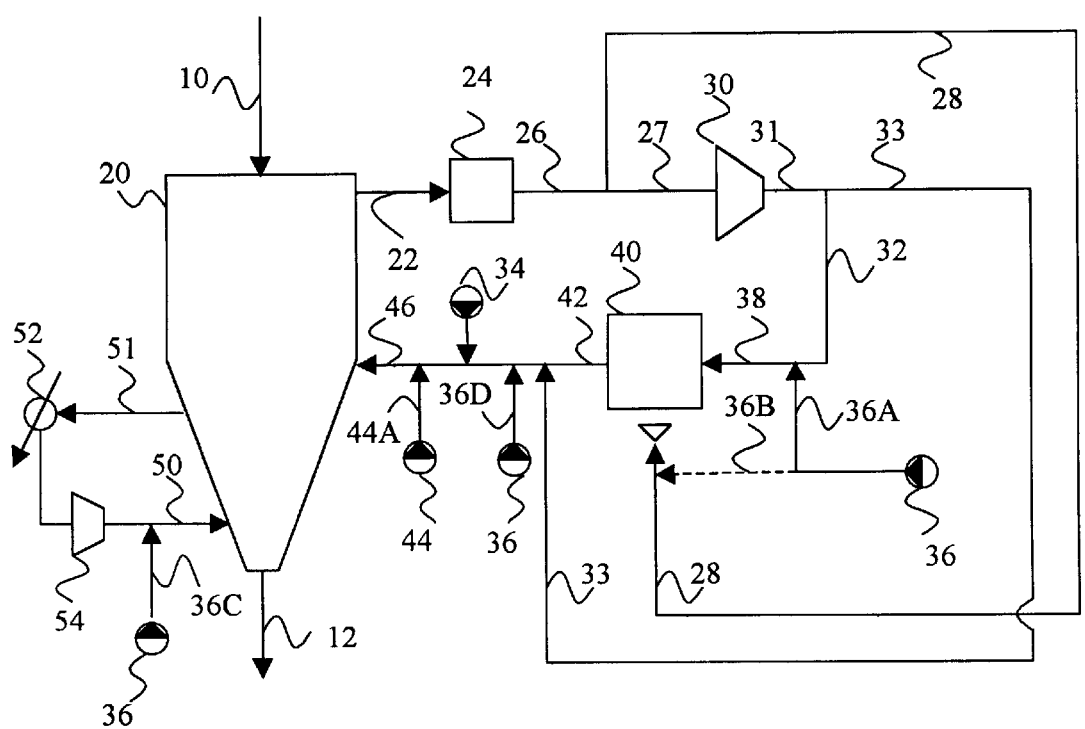
FIG. 1 shows the embodiment of the present invention as performed in a reduction plant wherein the effluent gas is split and recycled both to the gas reformer and directly to the reducing gas stream. Also shown are the streams of natural gas and oxygen and the optional introduction of steam to the reducing gas and the cooling circuit in the discharge zone.

FIG. 1 shows an embodiment of the present invention wherein an iron-oxide containing particulate material 10 is fed to the reduction reactor 20 in a manner known in the art. This material 10 is typically lump or pelletized iron ore. A hot reducing gas 46 is fed to reduction reactor 20 and after having been in contact with said iron-oxide containing material, these particles are substantially reduced to metallic iron. The reducing gas is withdrawn from the reduction reactor as an effluent gas 22, which is cooled and cleaned in a cooling device 24. The cooled and cleaned gas 26, is split into streams 27 and 28. Stream 28 feeds the burners of the reformer 40 (where it is burned as fuel recovering the heating potential of this gas). If necessary, this can be supplemented by a natural gas stream 36B also feeding the reformer burners. Stream 27 is connected to a compressor device 30 forming a pressurized stream 31, which is divided in streams 32 and 33. If this plant is an upgrade of an existing plant, then the compressor 30 might have to be enlarged to handle the increased volume of recycle gas achieved by the additions in streams 36D and 44A as discussed below. Often however the compressor has a sufficient reserve capacity to handle the increased load. The same is similarly true of the capacity of the reactor 20 (which can also adjust for the increased production by increased reaction rates and gas flow rates etc.).

A natural gas supply 36 is connected with stream 36A to the recycled gas stream 32 forming stream 38, which feed the gas reformer 40. The gas reformer 40 can be a catalytic reformer which produces a main reducing gas stream 42. The reason of introducing natural gas and the effluent gas to the reformer, is to react natural gas with carbon dioxide to produce hydrogen and carbon monoxide by the following reaction:

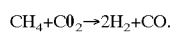

$$CH_4 + CO_2 \rightarrow 2H_2 + CO.$$

Consequently the reducing gas stream 42 exiting the reformer 40 is mainly composed of hydrogen and has a very low content of carbon dioxide ($CO_2$)

Recycled gas stream 33 is combined with the main reducing gas stream 42 exiting the gas reformer 40. Natural gas from supply 36, fed in stream 36D, and an oxygen containing gas 44, fed in a stream 44A, are combined with the main reducing gas stream 42 to form the final hot reducing gas 46.

By recycling a significant portion of the effluent gas directly to the reduction reactor, there is more $CO_2$ available in the reducing gas stream of the present invention as compared with the processes shown in the prior art (including U.S. Pat. No. 5,407,460, discussed infra).

With this $CO_2$ available and the introduction of oxygen (in a ratio of about 1 part of oxygen per about 3 parts of effluent gas recycled through stream 33) the temperature of the hot reducing gas 46 is increased into a range of about 900° C. to about to 1050° C., thus promoting the following shift-reaction:

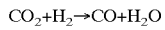

$$CO_2+H_2 \rightarrow CO+H_2O$$

The water produced by this shift-reaction is then utilized for natural gas reforming according to the following reaction:

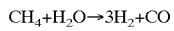

$$CH_4+H_2O \rightarrow 3H_2+CO$$

This reforming reaction produces more reducing agents and consequently the production increases for the same capacity of the reformer. A suitable supply of water in the form of steam 34 can be optionally introduced into the stream 42, if it is found convenient to promote reformation of natural gas with $H_2O$ within the reduction reactor in order to modify the $H_2/CO$ ratio of the reducing gas, as well as to control carburization of the DRI produced.

The ratio of the recycled effluent gas 33 and the natural gas 36D added after the reformer 40 can be about 4:1. The flow of recycled effluent gas 33 is about 5% to about 35% of the capacity flow rate in the reformer output stream 42.

The combination of streams 42, 33, 36D, 44A, and optionally 34, results in the hot reducing gas 46, which is connected directly to the reduction reactor 20. These streams need not necessarily be fed to the reformer stream 42 in the order illustrated. For example, the natural gas 36D could be added directly to the reduction zone of the reactor 20, thus in essence being combined with the reducing gas stream 46 within the reactor 20. On the other hand, natural gas is less expensive than reformed gas, so it could be preferable to have the natural gas added with the oxygen so as to have the partial oxidation by the added oxygen result from at least some burning of the natural gas rather than the hydrogen or carbon monoxide from the reformer.

When desired to operate the reduction reactor in a cool discharge mode, a cooling circuit is connected to the reduction reactor 20 wherein a cooling gas stream 50 is introduced to the reactor in order to contact the reduced material and exchange heat. The effluent cooling gas is withdrawn as stream 51 and is cooled in a cooling unit 52, then the cooled gas is pressurized by means of a second compressor device 54 and returned to the reduction reactor 20 as stream 50, normally supplemented by natural gas from supply 36 connected to stream 50 by stream 36C as a make-up gas.

Finally, the reduced iron-containing material 12 is withdrawn from reduction reactor 20 in a manner known in the art.

Pure oxygen 44 is used in lieu of air (having 20% $O_2$) with the advantage that the large volume of $N_2$ (80% of the air) does not have to be needlessly heated (and thus avoiding the need to preheat the stream 44A). As a result, the pre-heater, required by the teaching of the Bueno et al. U.S. Pat. No. 5,407,460, can be omitted (a fact unappreciated by Bueno et al. even though their patent incidentally mentions the use of pure oxygen addition instead of air). The applicants' preferred embodiment using pure oxygen thus saves the capital cost of a pre-heater unit, the energy cost of unnecessarily heating a large volume of nitrogen (from the air), and the cost and inefficiency of having to purge some of the valuable reducing gas more often to avoid the build up of nitrogen. These considerations more than offset the cost of the pure oxygen itself.

The applicants in an existing plant have made three comparative runs. The first run was at plant capacity using only the reformer. The second run was according to the teaching of the Bueno et al. U.S. Pat. No. 5,407,460 at capacity (limited by keeping the $O_2$ addition below the amount that results in agglomeration of the DRI). This resulted in a maximized increase in production of 55% without any increase in the reformer size. The third run was according to the present invention utilizing a split recycle with a maximum recycle flow through the existing reformer at its capacity plus a direct recycle flow that mixes with the reformer output plus added oxygen and natural gas to form the reducing gas fed to the reduction reactor. Because of the ameliorating effect in the applicants' process of the cooler directly recycled gas, the amount of added natural and even $O_2$ could be increased yielding a net grater amount of reducing gas without the temperature rise being so high as to cause agglomeration. Also the availability of $CO_2$ in the same directly recycled cool spent gas from the scrubber means that this $CO_2$ can act as an oxidant-reactant in lieu of adding more $O_2$ for the reformation of natural gas within the reactor. This means that the reactor runs cooler relative to a given amount of reducing gas generated. This all resulted in a production increase of about 91% without any increase in the reformer size. This was about a 36% improvement over the second run made according to the Bueno et al. patent.

What is claimed is:

1. A method for increasing the production of direct reduced iron (DRI) or of pre-reduced iron ore in an existing direct reduction plant having a reformer of a predetermined reforming capacity and a reduction reactor, which comprises:

introducing an iron-oxide-containing material to said reduction reactor;

introducing hot reducing gas to within said reduction reactor;

contacting said hot reducing gas with said iron-oxide-containing material within said reduction reactor;

reducing at least partially said iron-oxide-containing material to metallic iron, DRI or pre-reduced iron ore;

withdrawing from said reduction reactor the reducing gas, after having been contacted with said iron-oxide-containing material, as a top gas;

cooling and cleaning said top gas to form a cool gas stream;

pressuring at least a portion of said cool gas stream to form a pressurized recycle stream;

dividing said pressurized stream into at least two portions;

combining the first portion of said pressurized stream with natural gas forming a feeding reformer stream;

passing said feeding reformer stream through said gas reformer forming a main reducing gas stream;

combining the second portion of said pressurized stream, said main reducing gas stream, a stream of natural gas, and an oxygen-containing gas stream to form said hot reducing gas; and, withdrawing said at least partially reduced material from said reduction reactor.

2. A method according to claim 1, wherein the oxygen-containing gas stream is added without pre-heating.

3. A method according to claim 2, further comprising: adding a steam stream to said feeding reformer stream.

4. A method according to either, claim 1 or 3, further comprising: feeding the natural gas stream directly to said reduction reactor.

5. A method according to claim 4, wherein said natural gas stream is used for cooling the DRI in said reactor.

6. A method according to claim 2, wherein said oxygen-containing gas is oxygen.

7. A method according to claim 2, wherein said oxygen-containing gas is a mixture of air and oxygen.

8. A method according to claim 2, wherein the ratio of the second portion of said pressurized stream and the natural gas added after the reformer is about 4:1.

9. A method according to claim 2 or 8, wherein the flow of the second portion of said pressurized stream is about 5% to about 35% of the capacity flow rate of the reformer for output of the main reducing gas stream.

10. A method according to claim 2, wherein said natural gas stream is combined with the other streams making up and forming said hot reducing gas prior to introduction into the reactor.

* * * * *